March 8, 1927.
P. M. CURRIER
1,620,619
TRANSFORMER VOLTAGE REGULATING SYSTEM
Filed June 29, 1926
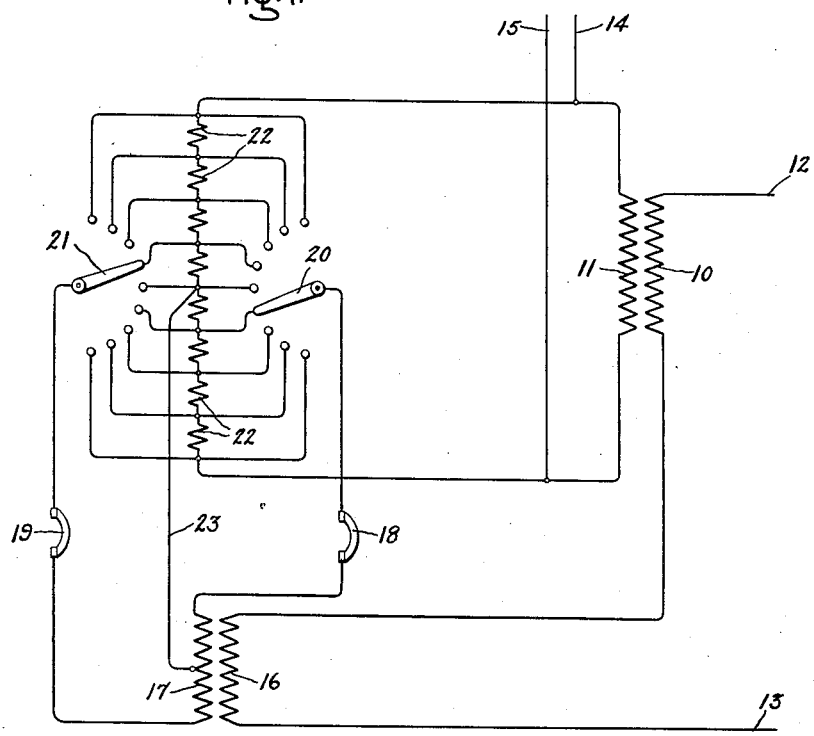
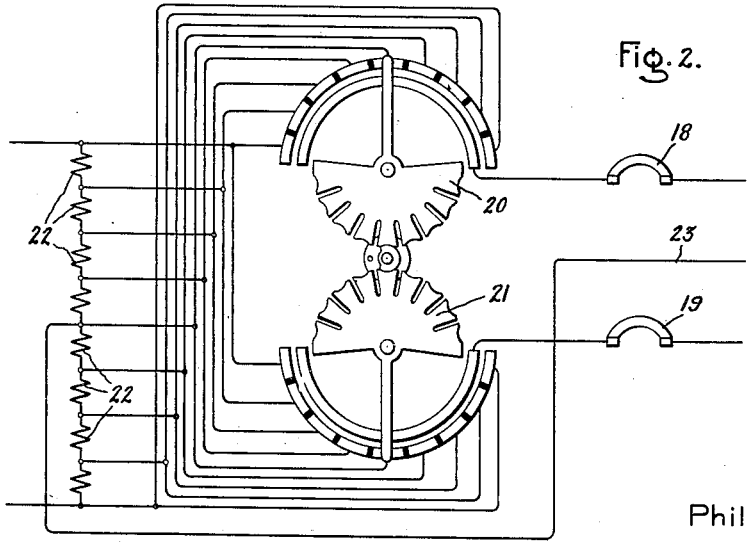
Inventor:
Philip M. Currier,
by
His Attorney.

Patented Mar. 8, 1927.

1,620,619

UNITED STATES PATENT OFFICE.

PHILIP M. CURRIER, OF BALLSTON LAKE, NEW YORK, ASSIGNOR TO GENERAL ELECTRIC COMPANY, A CORPORATION OF NEW YORK.

TRANSFORMER-VOLTAGE-REGULATING SYSTEM.

Application filed June 29, 1926. Serial No. 119,455.

My invention relates to transformer voltage regulating systems, and its general object is to provide an improved construction and arrangement whereby the voltage of a transformer may be regulated or adjusted without interrupting the load carried by the transformer. The invention provides a voltage regulating system which is simple and reliable and which makes it unnecessary to provide tap connections from the transformer windings, or otherwise to complicate the construction of the transformer, the voltage of which is to be regulated.

The invention will be explained in the following description taken in connection with the accompanying drawing, in which Fig. 1 shows in a diagrammatic way a transformer provided with a voltage regulating system in accordance with the invention, and Fig. 2 shows an arrangement which may be used for operating and controlling the switches shown in Fig. 1.

The transformer to be regulated is shown as having two windings 10 and 11, either of which may be the primary winding and the other the secondary winding. This main transformer is connected between two circuits, one circuit comprising the conductors 12 and 13, and the other circuit comprising the conductors 14 and 15. One winding 16 of a voltage regulating transformer is connected in series between the winding 10 of the main transformer and the conductor 13. The two terminals of the other winding 17 of the voltage regulating transformer are connected respectively through two circuit breakers 18 and 19 to the movable contacts of two multiple contact switches 20 and 21. The fixed contacts of both switches 20 and 21 are connected to a plurality of taps distributed along a transformer winding 22. This winding 22 should be excited from a source of current which is in synchronism with the currents in the windings 10 and 11 of the main transformer, and, as shown in the drawing, this may be done by using a single winding or auto transformer and connecting its terminals directly to the terminals of the winding 11. Intermediate points of the windings 17 and 22, preferably at or near their points of mid-voltage, are connected by a conductor 23.

Assuming that the conductors 14 and 15 constitute the primary circuit which supplies power to the conductors 12 and 13, then the winding 11 of the main transformer will be the primary winding. Now, if the tap switches 20 and 21 are positioned to connect the full winding 22 across the winding 17, then the full voltage of the winding 22 will be impressed across the terminals of the winding 17, which will induce maximum voltage in the winding 16. If the winding 22 is connected across the winding 17 in the proper direction, the voltage in the winding 16 will be added to that in the winding 10, and the voltage between the secondary conductors 12 and 13 will be a maximum. Under these conditions, the conductor 23, if connected between the exact mid-voltage points of the windings 17 and 22, will carry no current, because it connects equipotential points in these two windings.

The voltage in the winding 16, and thus the voltage between the secondary conductors 12 and 13, may now be reduced, when desired, by means of the circuit breakers 18 and 19, and the tap switches 20 and 21. One of the circuit breakers 18 and 19, say the circuit breaker 18, is opened. The winding 22 now acts as an auto transformer to supply one-half the winding 17 with the same voltage as before, but with twice the current, current now flowing in the conductor 23. There is now twice the current in half the turns of the winding 17, so that the voltage in the winding 16 is still unchanged. The position of the tap switch 20 is now changed from its end of the winding to the adjacent tap connection. This may be done without danger of sparking or burning, as no current is flowing through the switch. Then the circuit breaker 18 is closed. The winding 22 now acts as an auto transformer, and impresses a slightly reduced voltage (its full voltage less the voltage of one tap section) across the winding 17. The induced voltage in the winding 16 is thus also slightly reduced. The conductor 23 is no longer connected to the mid-voltage point of the winding 22 so that current now flows in this conductor. The winding 17 may be designed, however, with sufficient reactance between its two halves to limit the current in the conductor 23 to a value which is not objectionable. The other circuit breaker 19 is now opened, the tap switch 21 moved one step, and the circuit breaker 19 again closed, and a normal operating condition is thus reached with the voltage in the winding 16 reduced one step. The conditions during this operation of the circuit breaker 19 and tap switch 21 are similar to those which existed during the operation of the circuit breaker 18 and tap switch 20.

The cycle of operation which has been described may be repeated by continuing to move the tap switch connections along the taps in opposite directions, respectively, until the two tap switches have reached the center or mid-voltage point of the winding 22, which is the condition indicated at Fig. 2, when the voltage impressed on the winding 17, and thus the induced voltage in the winding 16, will have been reduced to zero, and the voltage between the secondary conductors 12 and 13 will be that of the secondary winding 10 of the main transformer. If the switching operations are continued in the same directions, a voltage will be induced in the winding 16 in opposition to the voltage in the winding 10 of the main transformer, and this opposed voltage will finally reach a maximum value in opposition to the voltage in the winding 10. The voltage between the secondary conductors 12 and 13 will then have been reduced to its minimum value. The circuit breakers 18 and 19 and the tap switches 20 and 21 may of course be interconnected by any suitable control mechanism which will operate them in proper sequence. In Fig. 2 is shown a double Geneva gear arrangement which may be used for operating the tap switches.

The operation of the system has been described, assuming that the conductors 14 and 15 constitute the primary circuit which supplies power through the system to the conductors 12 and 13. For any particular positions of the tap switches 20 and 21, however, the ratio of voltage transformation between the two circuits depends upon the relative voltages and numbers of turns in the various windings, and is independent of the direction of flow of power, so that the conductors 12 and 13 may constitute the primary circuit, if desired, and the voltage between the conductors 14 and 15 may then be regulated in the manner already described.

The invention has been described in what is now believed to be its most desirable form, but various modifications may of course be made within the scope of the invention as defined in the appended claims.

What I claim as new, and desire to secure by Letters Patent of the United States, is:

1. The combination with a main transformer of a transformer having a winding provided with taps, a voltage regulating transformer having one winding connected in series with a winding of said main transformer and a second winding having a connection from an intermediate voltage point thereof to an intermediate point of said tapped winding, and means for connecting each end of said second winding of the voltage regulating transformer to selected taps of said tapped winding.

2. The combination with a main transformer of a transformer having a winding provided with taps, a voltage regulating transformer having one winding connected in series with a winding of said main transformer and a second winding having a connection from an intermediate voltage point thereof to an intermediate point of said tapped winding, and means for connecting each end of said second winding of the voltage regulating transformer to selected taps of said tapped winding, each of said connecting means including a circuit breaker for interrupting the current therein while the connection is being changed from one tap to another.

3. The combination with a main transformer of an auto transformer having a winding provided with taps, a voltage regulating transformer having one winding connected in series with a winding of said main transformer and a second winding having a connection from an intermediate voltage point thereof to an intermediate point of said tapped winding, and means for connecting each end of said second winding of the voltage regulating transformer to selected taps of said tapped winding, said main transformer having a second winding connected across the terminals of said tapped winding.

4. The combination with a main transformer of a transformer having a winding provided with taps, a voltage regulating transformer having one winding connected in series with a winding of said main transformer and a second winding having a connection from an intermediate voltage point thereof to an intermediate point of said tapped winding, means for connecting each end of said second winding of the voltage regulating transformer to the taps of said tapped winding, and means for moving said connecting means along said taps in opposite directions, respectively.

In witness whereof, I have hereunto set my hand this 28th day of June, 1926.

PHILIP M. CURRIER.